United States Patent
Huang

(10) Patent No.: US 6,927,336 B2
(45) Date of Patent: Aug. 9, 2005

(54) INTERWORKING INTERFACE MODULE FOR TELECOMMUNICATION SWITCHING SYSTEMS

(76) Inventor: Hsun-Chien Huang, 3F-4, No. 26, Wuchuan 2 Rd., Wuku Industrial Dist., Hsinchuang, Taipei Hsien (TW)

( * ) Notice: Subject to any disclaimer, the term of this patent is extended or adjusted under 35 U.S.C. 154(b) by 693 days.

(21) Appl. No.: 10/108,336

(22) Filed: Mar. 29, 2002

(65) Prior Publication Data

US 2003/0185387 A1 Oct. 2, 2003

(51) Int. Cl.$^7$ ................................................ H02G 3/08
(52) U.S. Cl. ................ 174/52.1; 174/50; 174/50.52; 174/50.54; 174/53; 174/54; 174/55; 174/59; 174/60; 174/65 R; 361/727; 361/728; 361/730; 361/752; 361/796; 361/600; 361/803; 361/827; 220/3.2; 220/3.8; 220/241; 220/242
(58) Field of Search ................... 174/52.1, 50, 50.52, 174/50.54, 53, 54, 55, 59, 60, 65 R; 361/727, 728, 730, 752, 796, 600, 803, 827; 220/3.2, 3.8, 241, 242

(56) References Cited

U.S. PATENT DOCUMENTS

| | | | | |
|---|---|---|---|---|
| 5,255,322 A | * | 10/1993 | Farinelli et al. | 381/84 |
| 5,832,073 A | * | 11/1998 | Hannigan et al. | 379/325 |
| 5,834,693 A | * | 11/1998 | Waddell et al. | 174/65 R |
| 6,611,739 B1 | * | 8/2003 | Harvey et al. | 701/29 |
| 6,765,791 B2 | * | 7/2004 | Syring et al. | 361/685 |

* cited by examiner

Primary Examiner—Dean A. Reichard
Assistant Examiner—Anton B. Harris
(74) Attorney, Agent, or Firm—Rosenberg, Klein & Lee

(57) ABSTRACT

An interworking interface module for telecommunication switching systems has multiple interworking terminal I/O ports, tracking terminal I/O ports, and system terminal I/O ports, and an indicator lamp are mounted on the external panels of a mounting frame. Multiple connection modules are attached onto the inner surface of a mounting frame used for setting up interconnection between the above terminal I/O ports. Each connection module comprises a switching means, such that a terminal separated from the system connection is automatically switched to connect to a terminal resistor to damp any line oscillation due to open connection. Using the connection modules to interconnect the above terminals of the invention, the present invention is able to reduce the necessary interconnecting components and simplify the procedures for assembling a transit exchange platform, while the original service quality with respect to a line connection is maintained.

12 Claims, 9 Drawing Sheets

INTERWORKING INTERFACE MODULE FOR TELECOMMUNICATION SWITCHING SYSTEMS

BACKGROUND OF THE INVENTION

1. Field of the Invention

The present invention relates to an interworking interface module for telecommunication switching systems, in particular, an interworking interface module that allows for considerable reduction in components for establishing necessary interworking connections from among an interworking terminal, a system terminal, a monitor terminal, and a tracking terminal; and an interworking interface module that realizes the simplification of the assembling procedures for a transit exchange platform.

2. Description of Related Art

An interworking interface module is normally used to interface between two telecommunication exchange systems. According to the external configuration for an equivalent model, the interworking interface module is equipped with a pair of tracking terminal I/O ports (81), a pair of terminal I/O ports (82), a pair of system terminal I/O ports (83), a monitor terminal port (84) and an indication lamp (85). With reference to the equivalent circuit of an interworking interface module shown in FIG. 9, interconnection circuitry is created in the interworking interface module, such that the I/O ports of the system terminal (83) are respectively connected to the corresponding ports of the tracking terminal (81) in a normally closed circuit. However, the I/O ports of the interworking terminal (82) are respectively connected through a resistor R2 and a switch SW1 to the corresponding ports of the system terminal (83) in a normally open circuit. When an outside terminal from another system is inserted into the interworking terminal port (82), the original connection between the corresponding tracking terminal port (81) and the system terminal port (83) is broken. By such action, the same tracking terminal port (81) through the action of switch SW1 is switched to connect to the resistor R2. The terminal resistor adds a load for the tracking terminal (81) to damp any line oscillation due to a break in line connection.

The monitor terminal (84) is connected through a resistor R3 to the circuit of the interworking terminal (82), such that the operation status of the system can be monitored provided that the system is kept under normal operation. When an outside terminal is inserted into the monitor terminal port (84), the power to the indicator lamp (85) is enabled through the action of another switch SW2, causing illumination of the indicator lamp (85).

From the foregoing description of the switch operations and the logic of the circuit in the interworking interface module, it has become apparent that the main task of the above circuit design is to provide the means for establishing line connection and switching connections from among system terminal ports, a monitor terminal port, tracking terminal ports and cross-connection terminal ports for outside systems by mechanical switch controls. In the conventional methods, large numbers of conductive wires and interconnection components are often necessary for such interconnections. Also, proper isolation procedures have to be taken to prevent mutual line interference in a high frequency signal transmission. Thus, a conventional interworking interface module provides the switching capability but with too many components and complicated procedures, for which a better way to interconnect different systems is sought.

SUMMARY OF THE INVENTION

The main objective of the present invention is to provide an interworking interface module for telecommunications systems, through which the necessary interconnecting components can be effectively reduced and the assembly procedures for a transit exchange platform can be simplified.

The above-mentioned interworking interface module in accordance with one embodiment comprises a mounting frame, an output connection module and an input connection module.

A mounting frame has a pair of retainers mounted on the top and bottom edges for affixing the mounting frame of the interworking interface module inserted into the corresponding module slots on the backbone chassis. An indicator lamp is installed near the top of the front-end panel, and below the lamp a monitor terminal port, a pair of interworking terminal ports and a pair of tracking terminal ports are arranged in tandem. A pair of system terminal I/O ports is mounted on the back panel. The tracking terminal, interworking terminal and system terminal respectively each has a corresponding pair of I/O ports for linking the above-mentioned terminals.

An output connection module is formed by two complementary half sections, right half and left half, which are fitted together to form an integrated module shell for attaching on to a mounting frame. The integrated module shell encases a base module and two tubular extensions. The inner surface of the module shell is covered by a metal coating or is metal plated. Each tubular pipe has a conductive wire running through the hollow core. A core wire is secured inside the base module and connected to the back of the output port. One end of the conductive wire in the first tubular pipe is connected through the output core wire to the output port of the interworking terminal, and another end to the output port of the system terminal. One end of the second tubular pipe is connected through the output core wire to the output port of the system terminal and another end to the output port of the tracking terminal.

An input connection module is also formed by two half sections fitted together to form an integrated module shell and attached onto the mounting frame. The integrated module shell encases a base module and two tubular extensions. The inner surface of the module shell is covered by a metal coating or is metal plated. Each tubular pipe has a conductive wire running through the hollow core. A core wire is secured inside the base module. One end of the conductive wire in the third tubular pipe is connected through the input core wire to the input port of interworking terminal, and another end the to input port of the system terminal. One end of the fourth tubular pipe is connected through the input core wire to the input port of the system terminal, and another end to the input port of the tracking terminal.

The above-mentioned interworking interface module uses the input and output connection modules attached on a mounting frame to establish system connection from either the interworking terminal or tracking terminal. Since the input and output connection modules are built with modular design, the number of components involved in interworking can be considerably reduced and the assembly procedure for a transit exchange platform can be simplified.

The fixed core wire for the output port in the output connection module is linked to the back of the output port of the interworking terminal. One end of the fixed core wire for output port is connected to one end of the conductive wire encapsulated in the first tubular pipe, and another end of the conductive wire is connected to the output port of the system terminal. One end of the conductive wire in the second tubular pipe is located inside the module shell and connected to the first switching means, and another end is extended to the back of output port of the tracking terminal. The first switching means is installed underneath the fixed core wire for output port toward the perimeter of the module shell, through which the fixed core wire for output port is connected through the conductive wire to the tracking terminal in a normally closed circuit. When an outside terminal is inserted into the output port of the interworking terminal, the inserted terminal makes contact with the fixed core wire for output port, thus connecting to the output port of the system terminal. By the inserting action, the inserted terminal pushes against the first switching means, causing the original connection between the wire lead to the tracking terminal and the output port of system terminal to be broken.

In the above-mentioned output module shell a terminal resistor is installed between the grounding terminal and the first switching means. When the output port of the interworking terminal port is open, the terminal resistor and the wire lead to the output port of the tracking terminal form an open circuit. However, when an outside terminal is inserted into the output port of the interworking terminal port, the terminal resistor is connected through the first switching means to the output port of tracking terminal. The terminal resistor adds a load for the tracking terminal to damp any line oscillation caused by a break in line connection.

The above-mentioned output connection module also has a core wire for monitor terminal. The fixed core wire for monitor terminal is connected across to the fixed core wire for output port through a resistor. The core wire for monitor terminal is linked to the back of the monitor terminal inside the module shell. A second switching means is installed above the core wire toward the perimeter of the module shell. When an outside terminal is inserted into the monitor terminal port, it makes contact with the core wire for the monitor terminal, and the second switching means is connected through the action of a pusher, causing the indicator lamp to be turned on.

Like that in the output connection module, the input connection module also has a first switching mean internally installed. When an outside terminal is inserted into the input port of the interworking terminal, the inserted terminal makes contact with the fixed core wire for input port, and pushes against the first switching means, causing the original connection between the tracking terminal and the system terminal to be broken.

Like that in the output connection module, the input connection module also has a terminal resistor installed internally and connected between the grounding terminal and the first switching means. When the input port of the interworking terminal is open, the terminal resistor through the first switching means makes contact with the wire lead from the input port of the tracking terminal. The terminal resistor adds a load for the tracking terminal to damp line oscillation due to a break in line connection.

Other objectives, advantages, and novel features of the invention will become apparent from the detailed description when taken in conjunction with the attached drawings.

DETAILED DESCRIPTION OF THE PREFERRED EMBODIMENT

Figure 1:
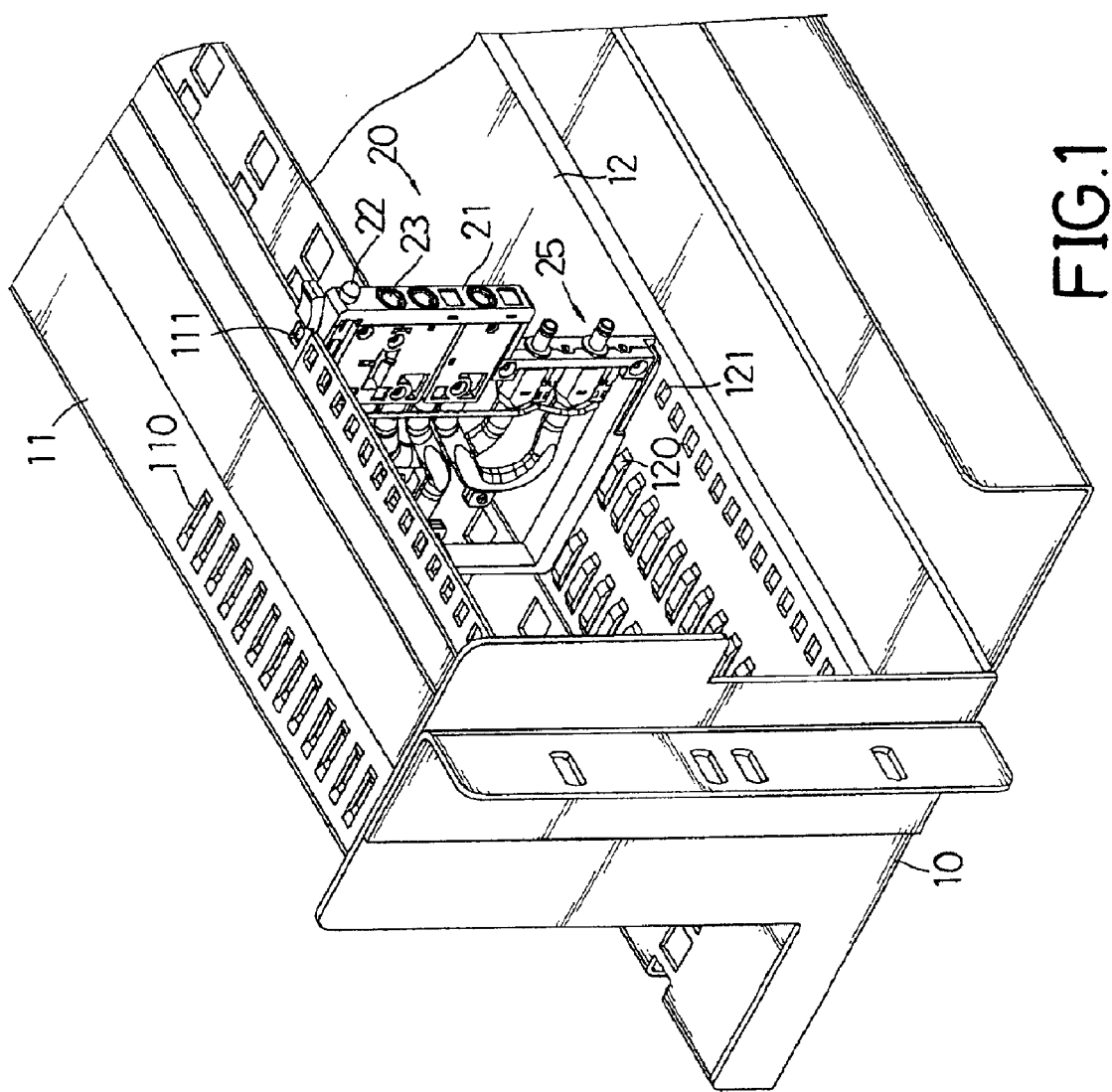
FIG. 1 is an operation setup for one embodiment in accordance with the present invention.
Figure 2:
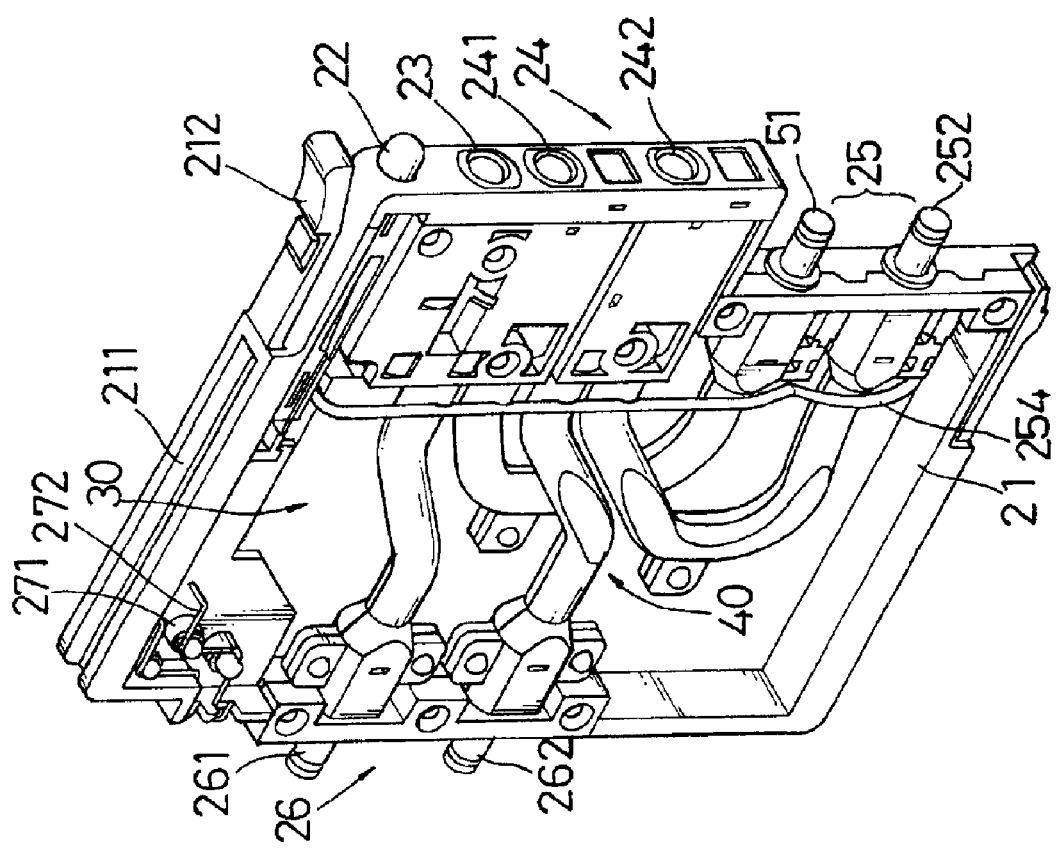
FIG. 2 is a perspective view of the configuration of an interworking interface module.
Figure 3:
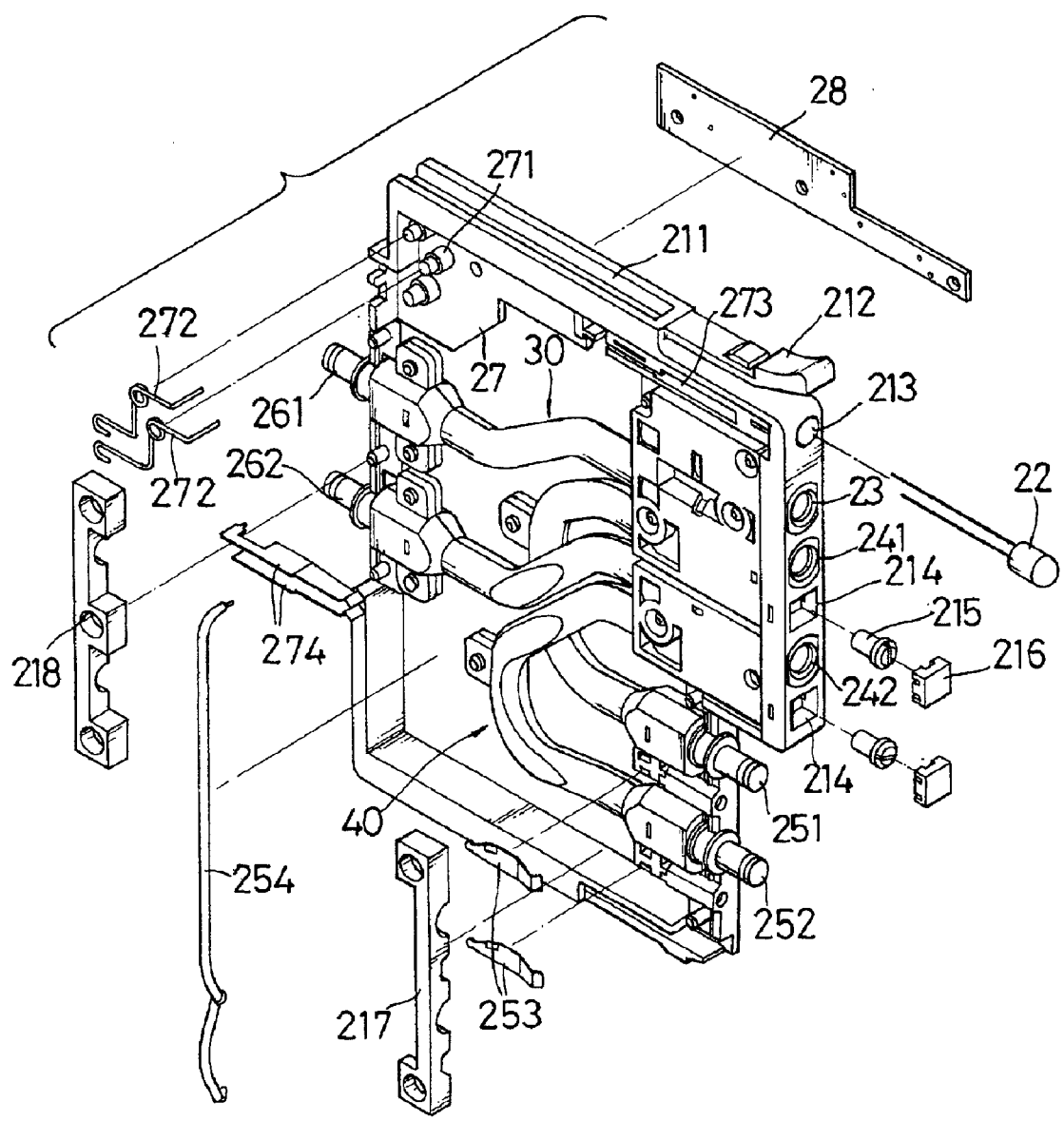
FIG. 3 is an exploded diagram of the interworking interface module.

With reference to FIG. 1, a telecommunication switching system for a telecommunication switching system includes a backbone chassis (10), on which multiple interworking interface modules (20) (only one is shown in the current embodiment) are inserted. The main purpose of the present invention is to provide an improved design for an interworking interface module. With reference to FIGS. 2 and 3, the interworking interface module comprises a mounting frame (21), an output connection module (30), and an input connection module (40).

A mounting frame (21) is equipped with a guide rail (211) and a retainer (212) at both the top and bottom edges for affixing the mounting frame (21) on to the backbone chassis (10). A tracking indicator lamp (22) is installed on top of the front panel, and below the lamp (22) a monitor terminal port (23), a pair of interworking terminal I/O ports (24) and a pair of tracking terminal I/O ports (25) are arranged in tandem. On the back plane a pair of system terminal I/O ports (26) are mounted. The above-mentioned terminals have matching input ports (241, 251, 261) and output ports (242, 252, 262).

An output connection module (30) has a core wire disposed internally for interconnecting the output ports (241, 251, 261) corresponding to the interworking terminal (24), tracking terminal (25) and system terminal (26), and for exchanging connections from among them.

An input connection module (40) also has a core wire disposed internally for interconnecting the input ports (242, 252, 262) corresponding to the interworking terminal (24), tracking terminal (25) and system terminal (26), and for exchanging connections from among them.

The front panel of the mounting frame (21) with an appropriate width has a lamp socket (213) set up on top for mounting a tracking indicator lamp (23), formed by a photo diode. A through hole (214) is opened in between the input port (241) and output port (242) of the interworking terminal (24) for setting a screw (215) to attach the input connection module (40) and the output connection module (30) on to the mounting frame (10). The through hole (214) is covered by a screw cap (216).

Immediately below the front panel on the lower section of the mounting frame (21) two half-round notches are formed. A first hold bracket (217) with two matching half-round notches is used to fit against the above-mentioned half-round notches using ultrasonic means after clamping the output port (251) and input port (252) of the tracking terminal (25) in the above-mentioned notches.

The middle section on the back panel of the mounting frame (21) also has two half-round notches. A second hold bracket (218) with two matching half-round notches is fitted against the above-mentioned half-round notches using ultrasonic means after clamping the output port (261) and input port (262) of the system terminal (26) in the above-mentioned notches.

At one of the upper inside corners of the mounting frame (21) a spacer (27) is mounted. The back side of the spacer (27) is installed with a circuit board (28), and one end of the spacer on the front side (27) has two fixed lugs (271) used for setting two conductive coils (272). One end of the conductive coil (272) stretches beyond the back panel to make contact with a power bus running along a cross bar underneath the upper plane (11) of the backbone chassis (10). After bending at right angle and passing through the spacer (27), the other end of the conductive coil (272) is connected to the circuit board (28) on the other side.

Toward the opposite corner of the mounting frame (10) relative to the lugs (271) and inside the top panel of the mounting frame (10), two parallel channels (273) are created, each with a conductive plate (274) placed in the channel space. These conductive plates (274) are placed in a position to make contact with the two pins of the tracking indicator lamp (22). On one end of the conductive plate (274) a pin protrudes perpendicularly, penetrating the spacer (27) to make contact with the circuit board (28) on the other side. Through the contacting pin, the circuit board (28) receives power from the conductive coil (272).

A conductive tab (253) is respectively installed on the output port (251) and input port (252) of the tracking terminal (25). These two conductive tabs (253) are connected through a common lead wire (254) to the circuit board (28).

Figure 4:
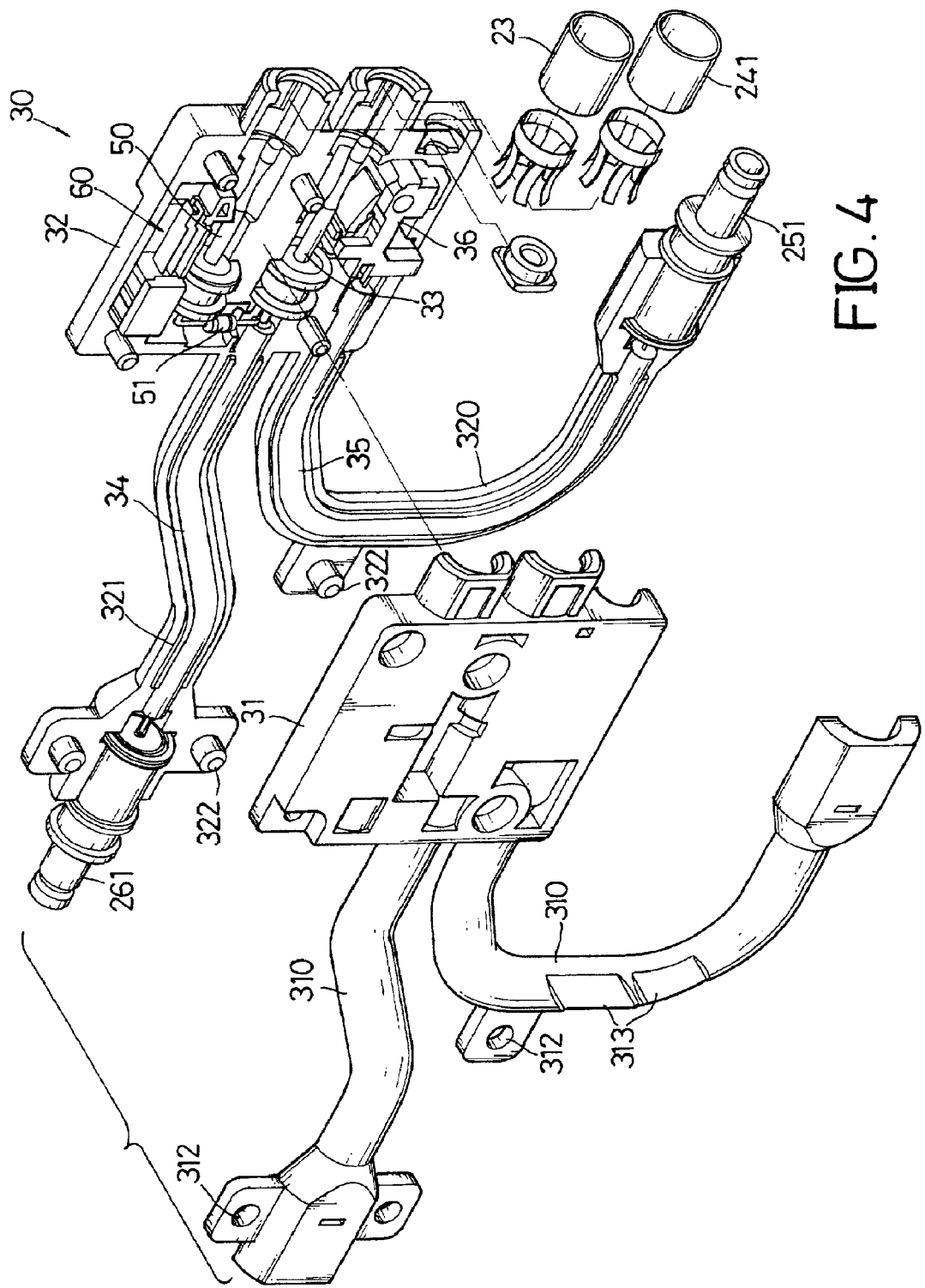
FIG. 4 is an exploded diagram of an output connection module.
Figure 5:
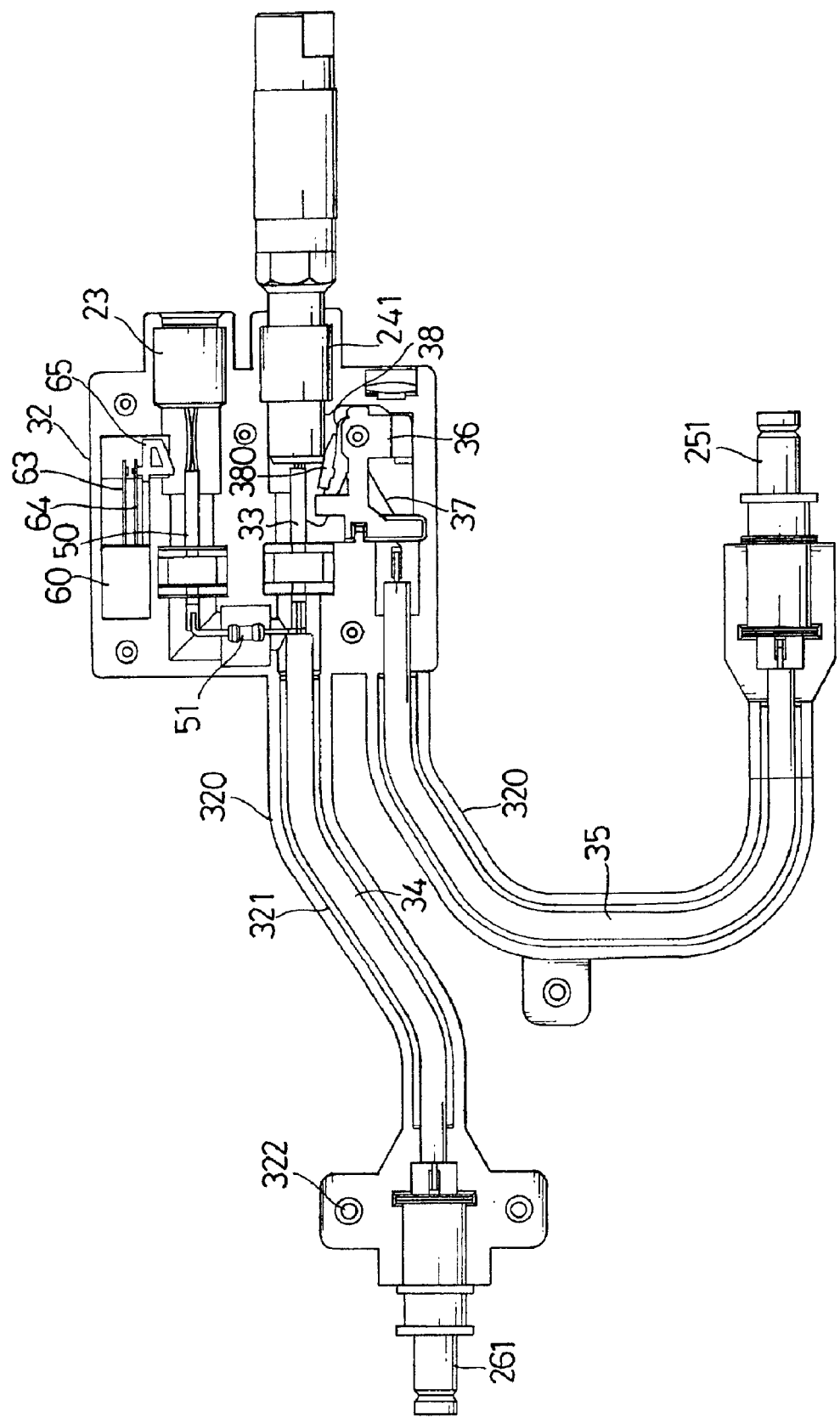
FIG. 5 is a cross-sectional view of an output connection module.

With reference to FIGS. 4 and 5, the output connection module (30) is encased in two matching half sections (31, 32) subsequently fitted together to become an integrated module shell for the output connection module (30). The above mentioned integrated module shell encases a base module and two tubular extensions. Each half of the integrated module shell (31, 32) includes two identical half sections (310, 320) of two tubular extensions. After fitting together two matching half sections (310, 320) of the above two tubular extensions, the hollow core of the first and second tubular pipes respectively contain two conductive wires (34, 35). An output core wire (33) is secured in one half section of the integrated module shell (32) with locking stubs (322), one end of the wire (33) connecting to the conductive wire (34) of the first tubular pipe, and another end of the wire (33) connecting to the output port (261) of the system terminal (26). One end of the conductive wire (35) leading from the second tubular pipe is connected to the fixed core wire for output port (33) through the first switching means, and the other end to the output port (251) of the tracking terminal (25).

A fixed rib (321) is created at a top and a bottom on the inner surface of one half (320) of the tubular extension from the same half of the integrated module shell (32). A groove (not shown in the diagram) is formed at a top and a bottom on the inner surface of another half (310) of the tubular extension leading from the same half section of the integrated module shell (31). These matching half sections (31, 32) are fitted against each other to form the output connection module (30) with two tubular pipes (310, 320). On the free end and in the middle of the tubular extension (310) locking holes (312) are created on fixing pads integrated on the left half section of the integrated module shell (31). On the free end and in the middle of the right half section (320) of the tubular extension corresponding locking stubs (322) are created for locating two half sections (310, 320) of the tubular extensions from the same half of the integrated module shell (31, 32) using ultrasonic means. At specified locations on an external wall of the tubular pipe (310, 320) multiple indents (313) are formed to prevent the tubular pipes of the output connection module (30) and the input connection module (40) from rubbing against each other which might cause short circuits.

With reference to FIG. 5, the first switching means in the module shell (32) makes a normally closed connection between the output port (261) of the system terminal (26) and the output port (251) of the tracking terminal (25). When an outside terminal is inserted into the output port (241) of the interworking terminal (24), the first switching means causes the original connection between the tracking terminal (25) and the system terminal (26) to be broken. The system terminal (26) instead is connected to the interworking terminal (24).

Figure 6:
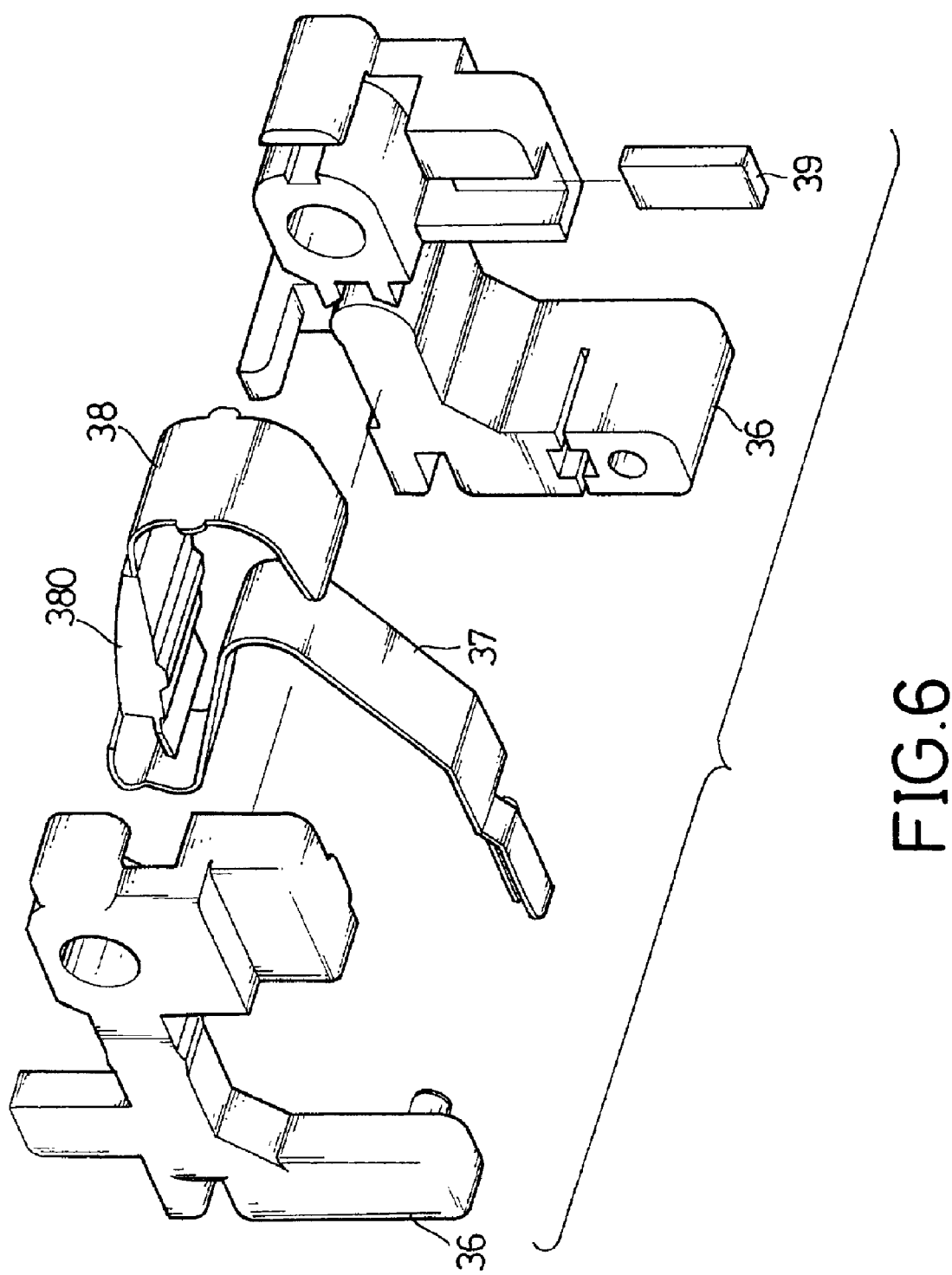
FIG. 6 is an exploded diagram of a first switching means in the output connection module.

According to the actual structure of the first switching means in the current embodiment as shown in FIG. 6, the first switching means is formed by two matching half sections fitted together to form a downward bending shape with two legs. In between these two half sections a first spring arm (37) and a second spring arm (38) in the shape of a bow are fitted on to the special structure on the internal surface of the first switching means. In conjunction with the reference diagram in FIG. 5, two ends of the first spring arm (37) are respectively connected to the fixed core wire for output port (33) and the wire lead (35) from the output port of the tracking terminal (25) in a normally closed circuit. One end of the second spring arm (38) corresponding to the near end of the first spring arm (37) is covered by an insulation sleeve (380), but these two spring arms are not in contact with each other without external applied force. The insulation sleeve (380) is in a position to make contact with the back surface of the output port (241) of the interworking terminal (24), when an outside terminal is inserted into the output port (241). The inserted terminal then makes contact with the fixed core wire for output port (33), and pushes against the insulation sleeve (380) of the second spring arm (38), causing the near end of the second spring arm (38) to press against the first spring arm (37). As a result of the inserting action, the original connection between the fixed core wire for output port (33) and the tracking terminal (25) is broken. The tracking terminal (25), instead of the interworking terminal (24), establishes a system connection through the fixed core wire for output port (33).

After the successfully establishing a connection between the system terminal (26) and the interworking terminal (24), the tracking terminal (25) is automatically switched to connect to a terminal resistor (39) to damp any line oscillation after separating from system connection. The terminal resistor (39) is accommodated in a specially designed trench on one half section of the first switching means with female locking blocks underneath the second spring arm (38), located on the second leg of the switching means. One end of the terminal resistor (39) is in contact with the metal plated inner surface of the module shell (32), and the other end is in contact with the remote end of the second spring arm (38). When the near end of the second spring arm (38) is pressed against the first spring arm (37), the output port (251) of the tracking terminal (25) is then connected to the terminal resistor (39) through the loop comprising the conductive wire (35) and the first and second spring arms (37, 38). The terminal resistor adds a load for the tracking terminal (25) to damp any line oscillation due to open connection.

Still referring to FIG. 5, the right half section of the module shell (32) of the output connection module (30) is secured with a core wire linking to the monitor terminal (50). The core wire for monitor terminal (50) is connected through an attenuation resistor (51) across to the fixed core wire for output port (33). The core wire for monitor terminal (50) is linked to the back of the monitor terminal (23) on the mounting frame (21). When an outside terminal is inserted into the monitor terminal port (23), the line signals transmitted through the fixed core wire for output port (33) can be retrieved through the core wire of the monitor terminal (50). A second switching means (60) is installed above the core wire (50) for a monitor terminal, toward the perimeter of the output module (30). When an outside terminal is inserted into the monitor terminal (23), the inserted terminal makes contact with the core wire for the monitor terminal (50) and the second switching means (60) is enabled through the action of a pusher, causing the power supply to the indicator lamp (22) to light up the lamp (22).

Figure 7:
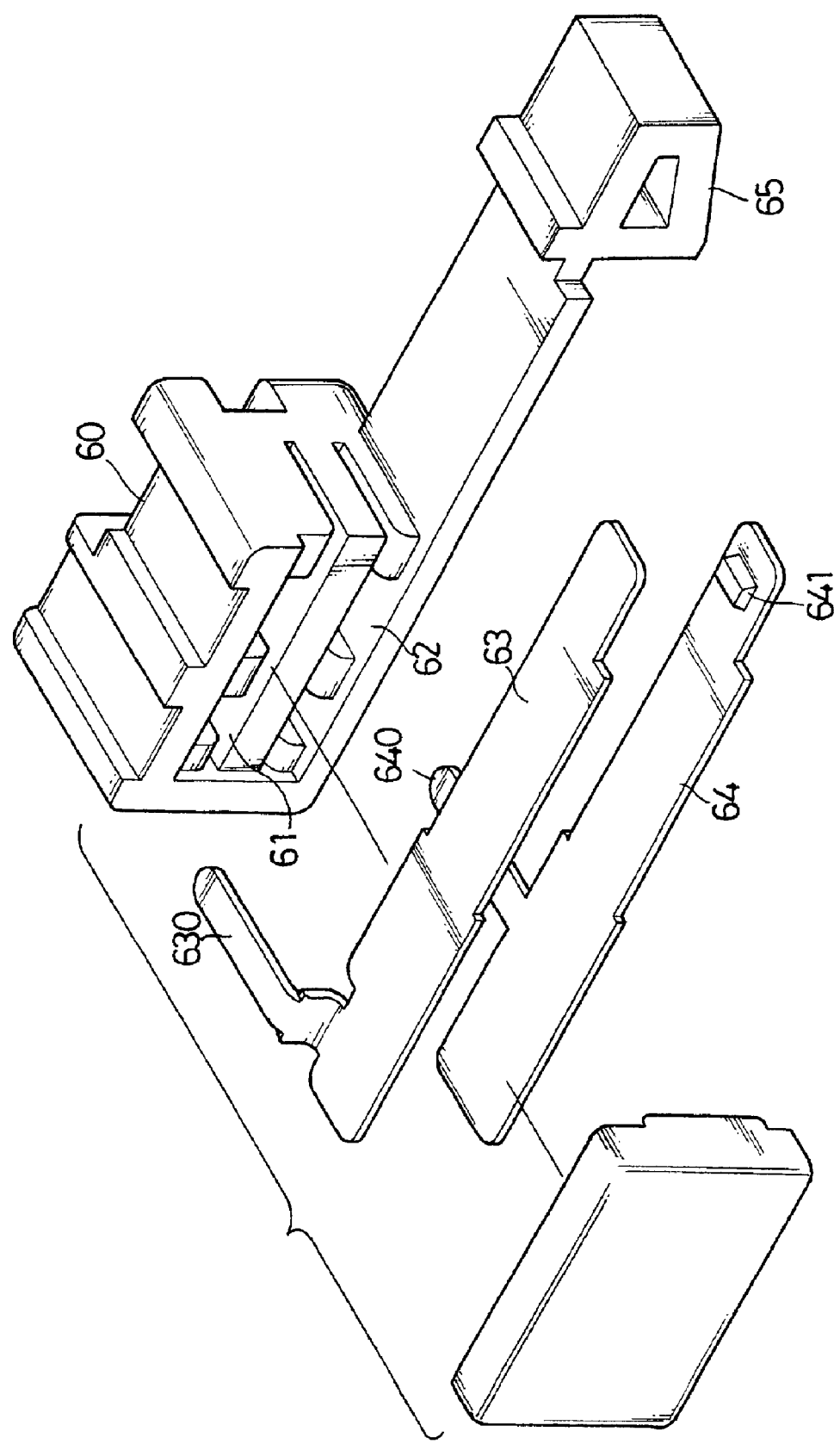
FIG. 7 is an exploded diagram of a second switching means in the output connection module.

According to the detailed structure of the second switching means shown in FIG. 7, two narrow channels (61, 62) are formed on the front side of an insulation block located on one end of the second switching means (60). Two switch blades (63, 64) are respectively placed inside the space of two channels (61, 62), each with a contact pin (630, 640) protruding perpendicularly. The contact pin (640) penetrates the spacer (27) mounted at one corner of the mounting frame (21) to make contact with the circuit board 28) on the other side of the spacer (27), thereby forming a switch for the tracking indicator lamp (22). On the remote end of these two switch blades (63, 64) two metal contacts (641) are created on the opposing surfaces forming a normally open circuit.

On the bottom of the insulation block extending out towards the remote end a pusher tab (65) is formed, whose slanted surface is placed to correspond to the top portion of the core wire for monitor terminal (50). When an outside terminal is inserted into the monitor terminal (23), the inserted terminal makes contact with the core wire for monitor terminal (50), and also pushes against the slanted surface of the pusher (65), pushing up the pusher (65), causing the two switch blades to touch each other through the metal contact points. The power supply is therefore connected to the tracking indicator lamp (22).

The foregoing covers the structure of the output connection module (30) in relation to the mounting frame (21). The structure of the input connection module (40) is basically identical to that of the output counterpart, only the portion with respect to the core wire for monitor terminal (50) is absent in the input connection module. A fixed core wire for input port, conductive wire and first switching means are secured inside the input connection module (40). When an outside terminal is inserted into the input port of the interworking terminal (24), the inserted terminal makes contact with the fixed core wire for an input port. By the inserting action, the inserted terminal pushes against the first switching means, causing the original connection between the tracking terminal and the input port of the system terminal (26) to break off. A terminal resistor is placed in the module and connected between the grounding terminal and the first switching means. When the input port of the interworking terminal is open, the terminal resistor through the action of the first switching means makes contact with the input port of the tracking terminal (252), thus rendering an extra load for the tracking terminal to damp any line oscillation due to open connection.

Figure 8:
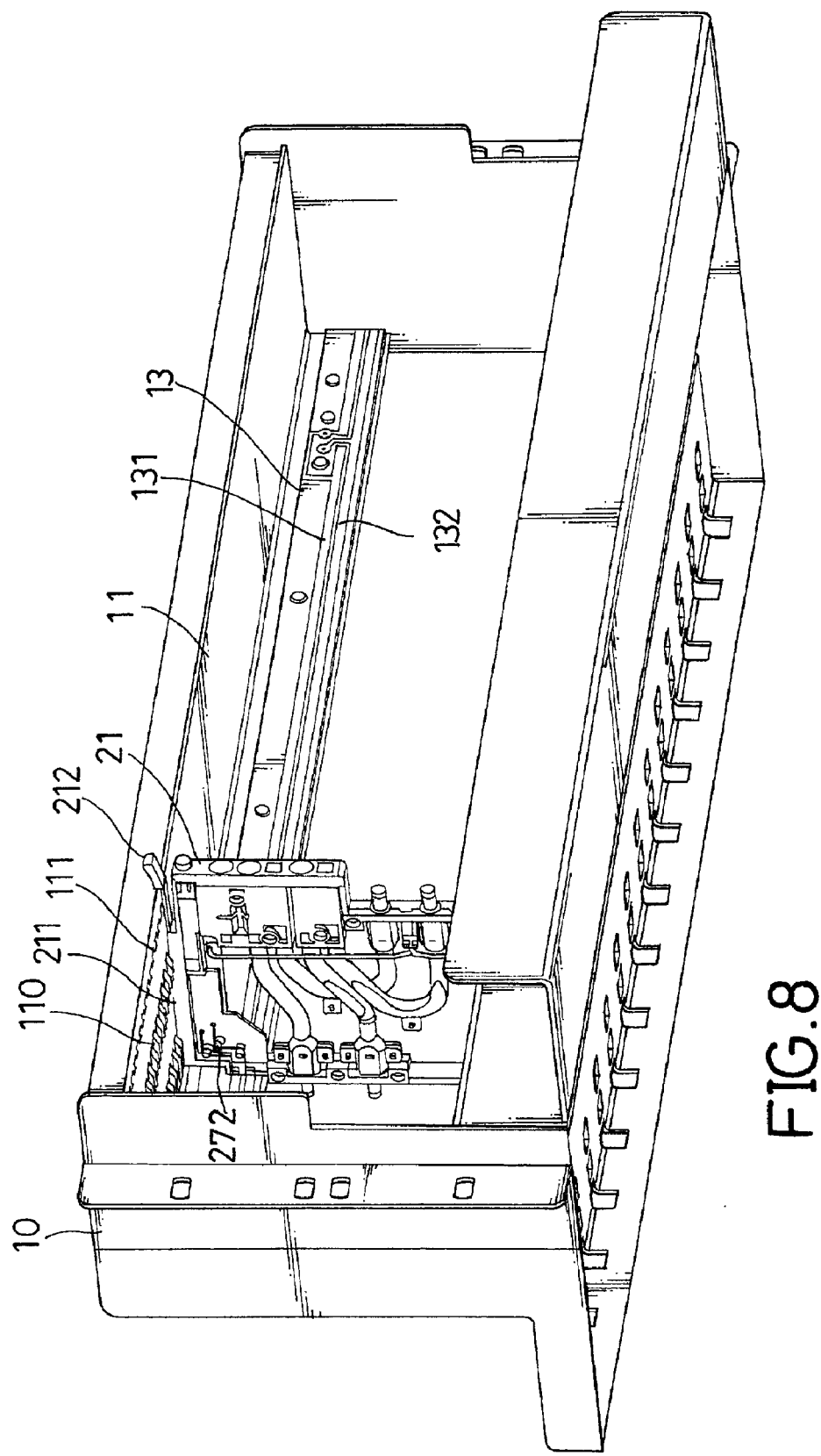
FIG. 8 is a side view perspective diagram of the invention.
Figure 9:
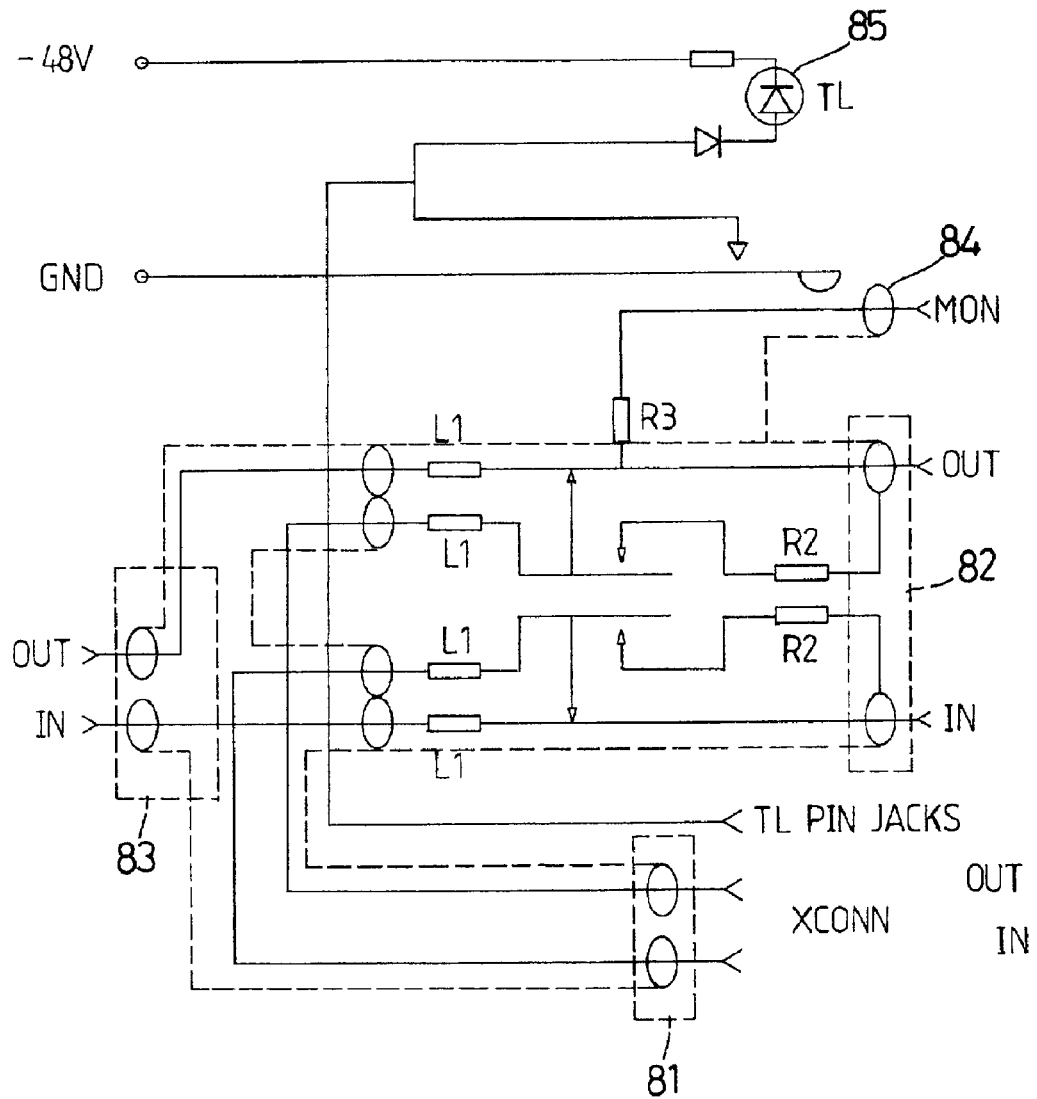
FIG. 9 is an equivalent circuit diagram of a conventional interworking interface.

Again referring to the outline diagrams in FIGS. 1 and 8, multiple guide blocks (110, 120) are formed in parallel formation on opposing surfaces of the upper plane (11) and lower plane (12) of the backbone chassis (10). The positions of guide blocks (110, 120) are to correspond to the positions of engagement holes (111, 121) near the front edge of the upper and lower planes (11,12) forming a straight line across the upper and lower support planes (11, 12). When a mounting frame of the interworking interface module is inserted along the guide rail (211) into a module slot between the upper and lower planes (11, 12), the positions of guide blocks (110,120) and the engagement holes (111, 121) respectively correspond to the guide rails (211) and retainers (212). The retainer (212) and engagement holes (111, 121) can then be firmly engaged to ensure a rigid installation for an interworking interface module (20).

On the back of the upper plane (11) a power bus (13) extends along a cross bar just beneath the upper plane (11). Two copper strips are used to create the power lines with opposite polarity (131, 132), on which multiple contact points are created by the conductive coils (272) on corresponding output connection modules (30). When an interworking interface module is inserted into an module slot in between the upper and lower planes, the two conductive coils (272) respectively make contact with the power lines with opposite polarity (131, 132) on the power bus (13), thus providing a power supply circuit for the interworking interface module.

From the foregoing it has become apparent that the present invention provides a modular interworking interface module which allows for system connection from either the interworking terminal or tracking terminal through a switching mechanism installed in both the input and output connection modules. Beside the service quality associated with a line connection, the present invention claims to have achieved a reduction in the number of interconnecting components and a simplification of the assembly procedures for a transit exchange platform used in telecommunication switching systems.

The foregoing illustration of the preferred embodiments in the present invention is intended to be illustrative only, under no circumstances should the scope of the present invention be so restricted.

What is claimed is:

1. A modular interworking interface module for telecommunication switching systems, which comprises:
   a mounting frame, with an indicator lamp mounted on a top portion of a front panel; a monitor terminal port, a pair of interworking terminal I/O ports and a pair of tracking terminal I/O ports arranged in tandem below the indicator lamp; and a pair of system terminal I/O ports mounted on a back panel; wherein the interworking terminal, tracking terminal and system terminal each has a pair of corresponding I/O ports;
   an output connection module with a conductive metal coating or metal plating on the internal surface, and multiple half-round notches for placing tubular pipes containing conductive wires, which allow for system connection and automatic exchange of line connection between a pair of output ports from the system terminal to either the tracking terminal or interworking terminal;
   an input connection module with a conductive coating or metal plating on the internal surface, and multiple half-round notches for placing tubular pipes containing conductive wires, which allow for system connection and automatic exchange of line connection between a pair of input ports from the system terminal to either the interworking terminal or tracking terminal.

2. A modular interworking interface module for telecommunication switching systems as claimed in claim 1, wherein the external configuration comprises a lamp socket with an indicator lamp, a pair of I/O ports for the interworking terminal, a pair of I/O ports for the system terminal, a pair of I/O ports for the tracking terminal, and a monitor terminal port; wherein:

the lamp socket formed near a top of the front panel with an appropriate width is for insertion of a tracking indicator lamp adapted from a photo diode;

a through hole formed in between the I/O ports of the interworking terminal for insertion of a set screw used is for affixing the input or output connection module on to the internal surface of the front panel; and a screw cap is fitted on-to the through hole opening to cover the set screw;

two half-round notches fixed on the lower portion of the front panel are for holding a pair of I/O ports;

a first hold bracket with two matching half-round notches is used to fit against the opposing surface of the above fixed notches for holding the pair of I/O ports on the front panel;

two half-round notches fixed on the back panel of the mounting frame are for holding a pair of I/O ports;

a second hold bracket with two matching half-round notches is used to fit against the opposing surface of the above fixed notches for holding the pair of I/O ports on the back panel;

the input ports and output ports of the tracking and system terminal are placed respectively in the corresponding notches before clamping the first and second hold brackets to hold the input ports and output ports in place.

3. A modular interworking interface module for telecommunication switching systems as claimed in claim 2, wherein a spacer is formed on an upper perimeter attaching to an inner surface of the mounting frame; and a circuit board is installed on a back side of the spacer;

two lugs are formed on one end of the spacer for setting the respective conductive coils, such that one end of the conductive coil protrudes beyond the back panel to make contact with a power bus underneath the upper plane running across the whole platform, and another end of the conductive coil after bending at right angle is made to pass through a hole in the spacer to make connection with a circuit board on the back side of the spacer;

two parallel channels are formed on the front surface and on the opposite end of the spacer relative to the position of the lugs, wherein two conductive plates are respectively fitted, such that the conductive plates are in a position to make contact with the two pins of the indicator lamp, and a pin protruding perpendicularly from each plate penetrates the spacer to make contact with the circuit board, such that the indicator lamp through the circuit board receives power from the conductive coils.

4. A modular interworking interface module for telecommunication switching systems as claimed in claim 3, wherein the I/O ports of the tracking terminal are each mounted with a spring tab connected to a common wire lead, through which the conductive wire is connected to the circuit board.

5. A modular interworking interface module for telecommunication switching systems as claimed in claim 1, wherein the output connection module contains a quadrangular base module and two tubular pipes, wherein the quadrangular base module and two tubular pipes are formed by two matching half sections of an integrated module shell, each forming a cross-section of the tubular pipes and base module;

a fixed core wire for an output port is placed inside the base module linking to the back of the output port of the interworking terminal;

two conductive wires are respectively encapsulated in a hollow core of the two tubular pipes, such that one end of the first conductive wire is connected to a fixed core wire for an output port, while another end is connected to the output port of the system terminal; whereas one end of the second conductive wire is connected to the fixed core wire for the output port through a first switching means also housed in the base module, while another end is connected to the output port of the tracking terminal.

6. A modular interworking interface module for telecommunication switching systems as claimed in claim 1, wherein the input connection module contains a rectangular base module and two tubular pipes, wherein the rectangular base module and two tubular pipes are formed by two matching half sections of an integrated module shell, each forming a cross-section of the tubular pipes and connection module;

a fixed core wire for input port is placed inside the base module linking to the back of the input port of the interworking terminal;

two conductive wires are respectively encapsulated in the hollow core of the tubular pipes, such that one end of the first conductive wire is connected to the fixed core wire for input port, while another end is connected to the input port of the system terminal; whereas one end of the second conductive wire is connected to the fixed core wire for input port through a first switching means also housed in the base module, while another end is connected to the input port of the tracking terminal.

7. A modular interworking interface module for telecommunication switching systems as claimed in claim 5, wherein the first switching means is formed by two matching half sections fitted together by multiple locking blocks and holes, forming a downward curving shape with two legs;

in between these two half sections a first spring arm and a second spring arm in the shape of an archery bow are fitted on to the special structure on the internal surface of the first switching means, such that two ends of the first spring arm are respectively connected to the fixed core wire for output port and the output port of the tracking terminal forming a normally closed circuit; whereas one end of the second spring arm is capped with an insulation sleeve, corresponding to the near end of the first spring arm, and the same end is disposed in between the fixed core wire for output port and the first spring arm, the two spring arms remaining separate without external applied force;

a terminal resistor is placed in a trench located on the second leg, such that one end of the terminal resistor makes contact with the internal surface of the metal plated sidewall of the locking block, and another end is connected to the second spring arm.

8. A modular interworking interface module for telecommunication switching systems as claimed in claim 6, wherein the first switching means is formed by two matching half sections of a module shell fitted together with multiple locking stubs and holes, forming a downward curving shape with two legs;

in between these two half sections a first spring arm and a second spring arm in the shape of an archery bow are fitted on to the special structure on the internal surface of the first switching means, such that two ends of the first spring arm are respectively connected to the fixed core wire for output port and the output port of the tracking terminal forming a normally closed circuit; whereas one end of the second spring arm is capped with an insulation sleeve, corresponding to the near end of the first spring arm, and the same end is disposed in between the fixed core wire for the output port and the first spring arm, the two spring arms remaining separate without external applied force;

a terminal resistor is placed in a trench located on the second leg, such that one end of the terminal resistor makes contact with the internal surface of the metal plated sidewall of the locking block, and another end is connected to the second spring arm.

9. A modular interworking interface module for telecommunication switching systems as claimed in claim 5, wherein fixed ribs are created on top and bottom ends and on an internal surface of the right half section of tubular extensions, whereby trenches are formed on the corresponding top and bottom ends and on an internal surface of the left half section of tubular extensions for mutual locking on to each other when fitted together;

multiple locking holes and stubs are respectively formed on the free end and in the middle of the tubular pipes extensions from the integrated module shell, in corresponding positions and on opposing surfaces, for securely fitting two matching half sections of the tubular pipe extensions using ultrasonic means;

multiple indents are formed at the specific locations on the external wall of the two tubular pipes to prevent the tubular pipes of the input connection module and output connection module from rubbing against each other to cause a short circuit.

10. A modular interworking interface module for telecommunication switching systems as claimed in claim 6, wherein fixed ribs are created on the top and bottom ends on the internal surface of the right half section of tubular extensions, whereas trenches are formed on the corresponding top and bottom ends on the internal surface of the left half section of tubular extensions for locking on to each other when fitted together;

multiple locking holes and stubs are formed on respective half sections on the free end and in the middle of the tubular pipes extensions from the integrated module shell, in corresponding positions and on opposing surfaces, for securely fitting two matching half sections of the tubular pipe extensions with ultrasonic means;

multiple indents are formed at the specific locations on the external wall of the two tubular pipes to prevent the tubular pipes of the input connection module and output connection module from rubbing against each other to cause a short circuit.

11. A modular interworking interface module for telecommunication switching systems as claimed in claim 5, wherein the output connection module has a core wire for the monitor terminal, and the core wire for monitor terminal is linked through an attenuation resistor to the fixed core wire for the output port on one end, and to the back of the monitor terminal on another end; and on the perimeter of the core wire for monitor terminal a second switching means is installed, wherein two parallel channels are formed on the sidewall of an insulation block in the second switching means (60), in which two switch blades are respectively placed; wherein each has a contact pin protruding perpendicularly, allowing the contact pins to penetrate the spacer to make contact with the circuit board on the other side, thus forming a switch for the tracking indicator lamp;

a pusher is created at the bottom of the insulation block extending towards the remote end, whose slanted surface corresponds to the top portion of the core wire for a monitor terminal.

12. A modular interworking interface module for telecommunication switching systems as claimed in claim 1, wherein at both top and bottom edges of a mounting frame a guide rail and a retainer are installed for securing the mounting frame in a module slot between upper and lower planes of the backbone chassis; and pairs of guide blocks and engagement holes are formed on the opposing surfaces of the upper and lower planes; such that each pair of guide blocks and a matching engagement hole are disposed in a straight line across the upper and lower planes corresponding to the position of the module slot, and also the positions of guide blocks and engagement holes correspond to the guide rails and retainers on the mounting frames for securely mounting the interworking interface modules;

on the back of the backbone chassis a power bus is mounted on a cross bar just below the upper plane, whereon two copper strips are installed to form the power lines with opposite polarity of the power circuit for the interworking interface module.

* * * * *